United States Patent
Ying et al.

(10) Patent No.: US 12,028,822 B2
(45) Date of Patent: Jul. 2, 2024

(54) SIGNALING OF TIMING ADVANCE (TA) OFFSETS IN IAB NETWORKS

(71) Applicant: Apple Inc., Cupertino, CA (US)

(72) Inventors: Dawei Ying, Hillsboro, OR (US); Geng Wu, Portland, OR (US); Lili Wei, Portland, OR (US); Qian Li, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 568 days.

(21) Appl. No.: 17/286,217

(22) PCT Filed: Oct. 24, 2019

(86) PCT No.: PCT/US2019/057832
§ 371 (c)(1),
(2) Date: Apr. 16, 2021

(87) PCT Pub. No.: WO2020/086826
PCT Pub. Date: Apr. 30, 2020

(65) Prior Publication Data
US 2021/0345279 A1 Nov. 4, 2021

Related U.S. Application Data

(60) Provisional application No. 62/750,563, filed on Oct. 25, 2018.

(51) Int. Cl.
*H04W 74/0833* (2024.01)
*H04W 56/00* (2009.01)

(52) U.S. Cl.
CPC ... *H04W 56/0045* (2013.01); *H04W 56/0055* (2013.01); *H04W 74/0833* (2013.01)

(58) Field of Classification Search
CPC ......... H04W 56/0045; H04W 56/0055; H04W 74/0833

(Continued)

(56) References Cited

U.S. PATENT DOCUMENTS 9,402,255 B2 7/2016 Löhr et al.
2016/0301515 A1 10/2016 Ouchi et al.
(Continued)

FOREIGN PATENT DOCUMENTS

CN 102318229 1/2012
CN 107113871 8/2017
WO 2016106676 7/2016

OTHER PUBLICATIONS

International Search Report and Written Opinion for International Application No. PCT/US2019/057832, mailed Feb. 12, 2020, 7 pgs.
(Continued)

*Primary Examiner* — Faisal Choudhury
(74) *Attorney, Agent, or Firm* — Kowert, Hood, Munyon, Rankin & Goetzel, P.C.

(57) ABSTRACT

Embodiments of an integrated access and backhaul (IAB) node, a User Equipment (UE), and methods of communication are generally described herein. An IAB node may operate as a relay between an IAB donor and a UE. The IAB node may receive, from the IAB donor, first signaling that indicates a first timing advance (TA) offset between the IAB donor and the IAB node. The IAB node may determine a second TA offset between the IAB node and the UE. The second TA offset may be based on a timing difference between a transmission time of a downlink frame transmitted to the UE and a reception time of an uplink frame from the UE. The IAB node may transmit, to the UE, second signaling that indicates the first TA offset and the second TA offset.

20 Claims, 11 Drawing Sheets

(58) Field of Classification Search
USPC .......................................................... 370/350
See application file for complete search history.

(56) References Cited

U.S. PATENT DOCUMENTS

| | | | |
|---|---|---|---|
| 2018/0092139 A1 | 3/2018 | Novlan et al. | |
| 2018/0102807 A1 | 4/2018 | Chen | |
| 2018/0110074 A1 | 4/2018 | Akkarakaran et al. | |
| 2018/0192443 A1 | 7/2018 | Novlan et al. | |
| 2019/0349871 A1* | 11/2019 | Ghosh | H04B 7/155 |
| 2020/0059879 A1* | 2/2020 | Nam | H04L 27/2666 |
| 2021/0345273 A1* | 11/2021 | Xing | H04W 56/006 |
| 2021/0385776 A1* | 12/2021 | Dahlman | H04W 56/0025 |

OTHER PUBLICATIONS

First Office Action for CN Application No. 201980070192.4; Jan. 12, 2024.
Ericsson "Setup procedures for IAB-node and a UE connected to an IAB node"; 3GPP TSG-RAN WG3 #99 R3-181313; Feb. 26, 2018.
Zte et al. "Discussion on physical layer enhancements for NR IAB"; 3GPP TSG RAN WG1 Meeting #94bis R1-1811160; Oct. 8, 2018.
Wang et al. "Timing Synchronization Technology of Satellite Mobile Communication System"; 2014.

* cited by examiner

Option 1

Option 2

SIGNALING OF TIMING ADVANCE (TA) OFFSETS IN IAB NETWORKS

PRIORITY CLAIM

This application claims the benefit of priority to U.S. Provisional Patent Application Ser. No. 62/750,563, filed Oct. 25, 2018, which is incorporated herein by reference in its entirety.

TECHNICAL FIELD

Embodiments pertain to wireless communications. Some embodiments relate to wireless networks including 3GPP (Third Generation Partnership Project) networks, and 3GPP LTE (Long Term Evolution) networks, Fifth Generation (5G) networks, and/or New Radio (NR) networks. Some embodiments relate to integrated access and backhaul (IAB) networks. Some embodiments relate to timing advance (TA) offsets. Some embodiments relate to signaling of TA offsets in IAB networks.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
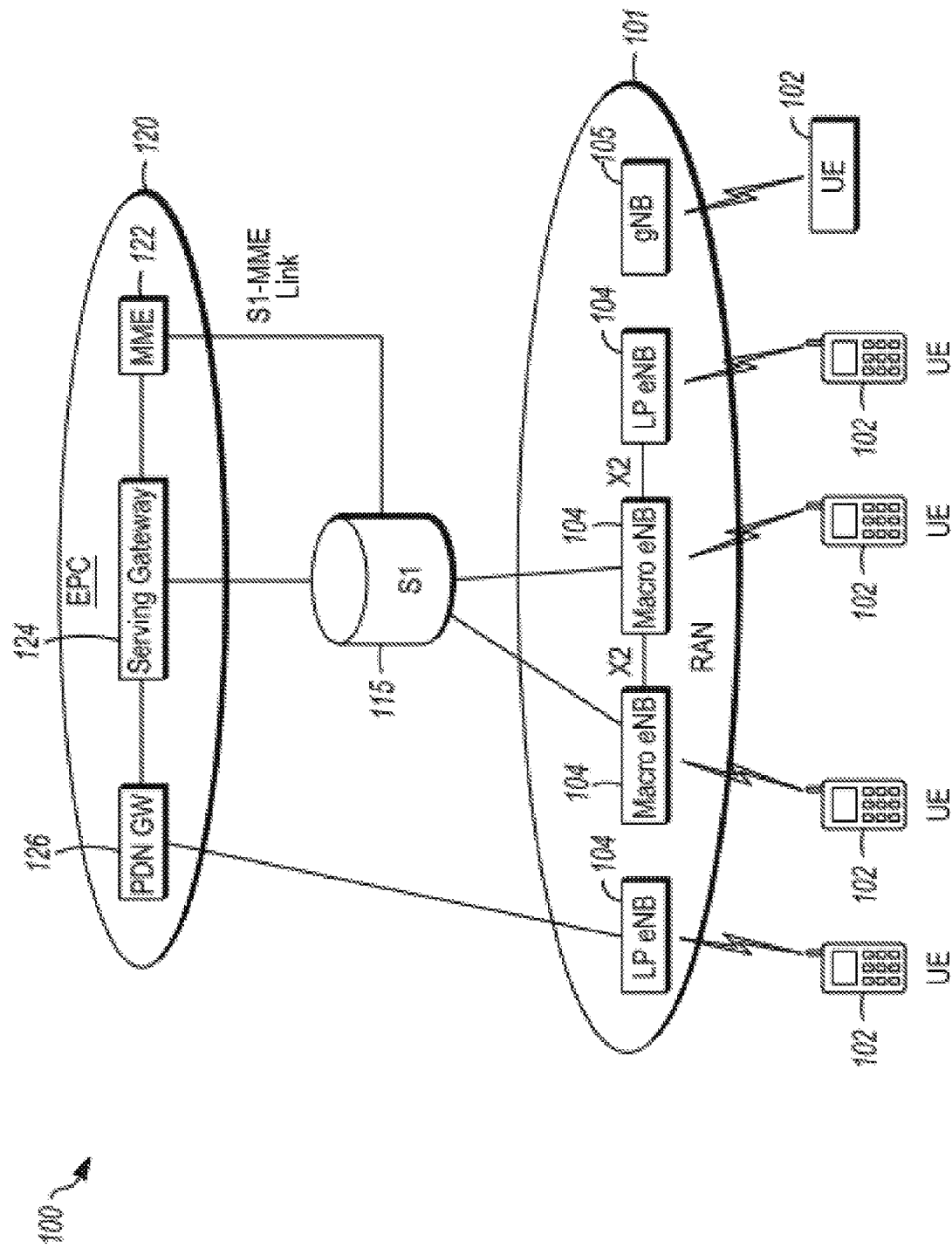
FIG. 1A is a functional diagram of an example network in accordance with some embodiments.
Figure 1B:
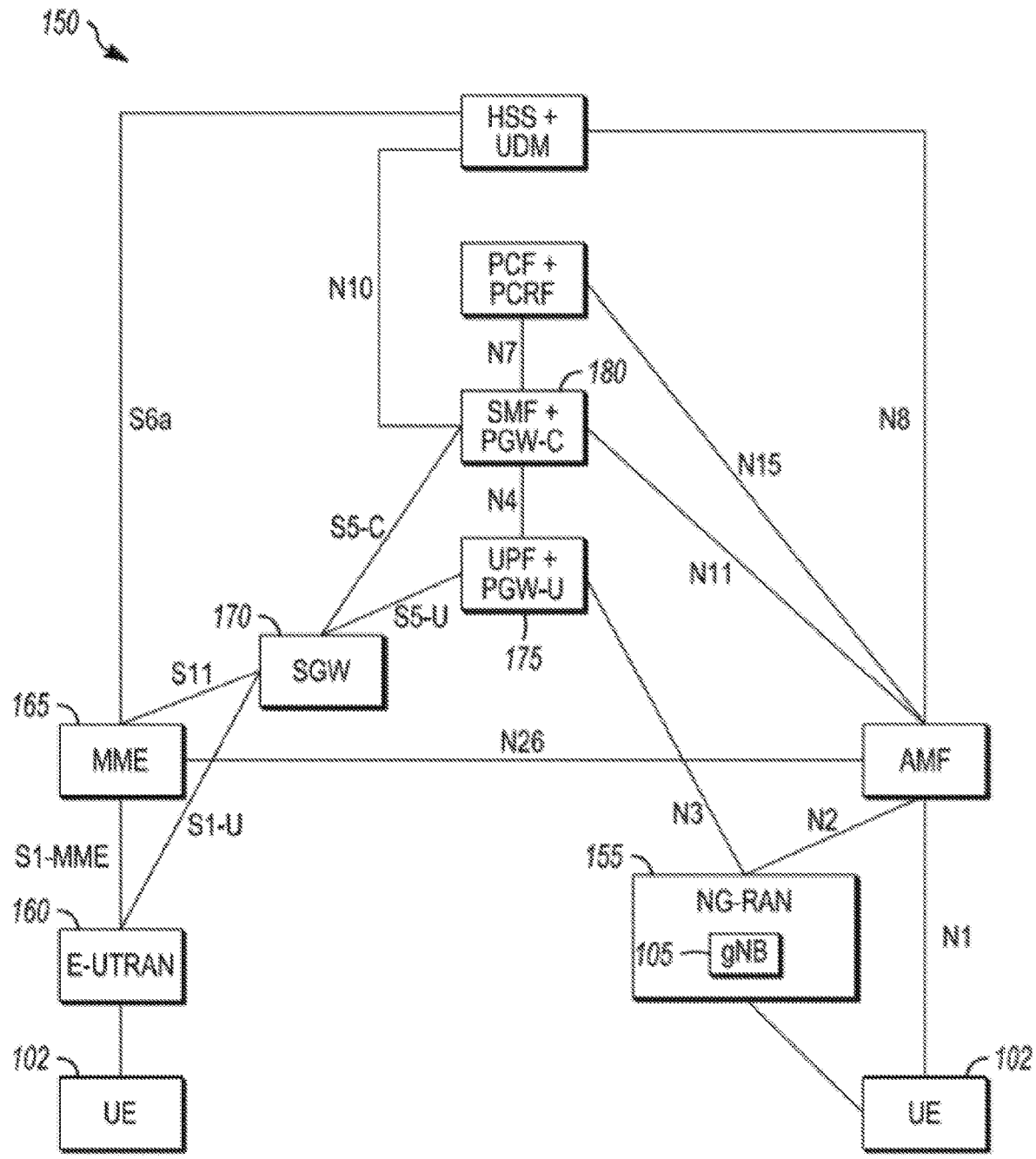
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network, a new radio (NR) network and/or Fifth Generation (5G) network. Other networks may be used in some embodiments. In some embodiments, a network may include one or more of: one or more components shown in FIG. 1A; one or more components shown in FIG. 1B; and one or more additional components. Some embodiments may not necessarily include all components shown in FIG. 1A and FIG. 1B.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In some embodiments, the RAN 101 may include one or more of: one or more components of an evolved universal terrestrial radio access network (E-UTRAN), one or more components of an NR network, and/or one or more other components.

The core network 120 may include a mobility management entity (MME) 122, a serving gateway (serving GW) 124, and packet data network gateway (PDN GW) 126. In some embodiments, the networks 100, 150 may include (and/or support) one or more Evolved Node-B's (eNBs) 104 and/or one or more Next Generation Node-B's (gNBs) 105. The eNBs 104 and/or gNBs 105 may operate as base stations for communicating with User Equipment (UE) 102. In some embodiments, one or more eNBs 104 may be configured to operate as gNBs 105. Embodiments are not limited to the number of eNBs 104 shown in FIG. 1A or to the number of gNBs 105 shown in FIG. 1B. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with one or more of: a 3GPP LTE protocol/standard, an NR protocol/standard, a Fifth Generation (5G) protocol/standard; and/or other protocol/standard, although the scope of embodiments is not limited in this respect.

Descriptions herein of one or more operations, techniques and/or methods practiced by a component (such as the UE 102, eNB 104, gNB 105 and/or other) are not limiting. In some embodiments, one or more of those operations, techniques and/or methods may be practiced by another component.

The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. The serving GW 124 and the MME 122 may be implemented in one physical node or separate physical nodes.

In some embodiments, UEs 102, the eNB 104 and/or gNB 105 may be configured to communicate Orthogonal Frequency Division Multiplexing (OFDM) communication signals over a multicarrier communication channel in accordance with an Orthogonal Frequency Division Multiple Access (OFDMA) communication technique.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165, which may be similar to the MME 122 described herein, although the scope of embodiments is not limited in this respect. In some embodiments, the network 150 may include the SGW 170, which may be similar to the SGW 124 described herein, although the scope of embodiments is not limited in this respect.

Embodiments are not limited to the number or type of components shown in FIG. 1B. Embodiments are also not limited to the connectivity of components shown in FIG. 1B.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
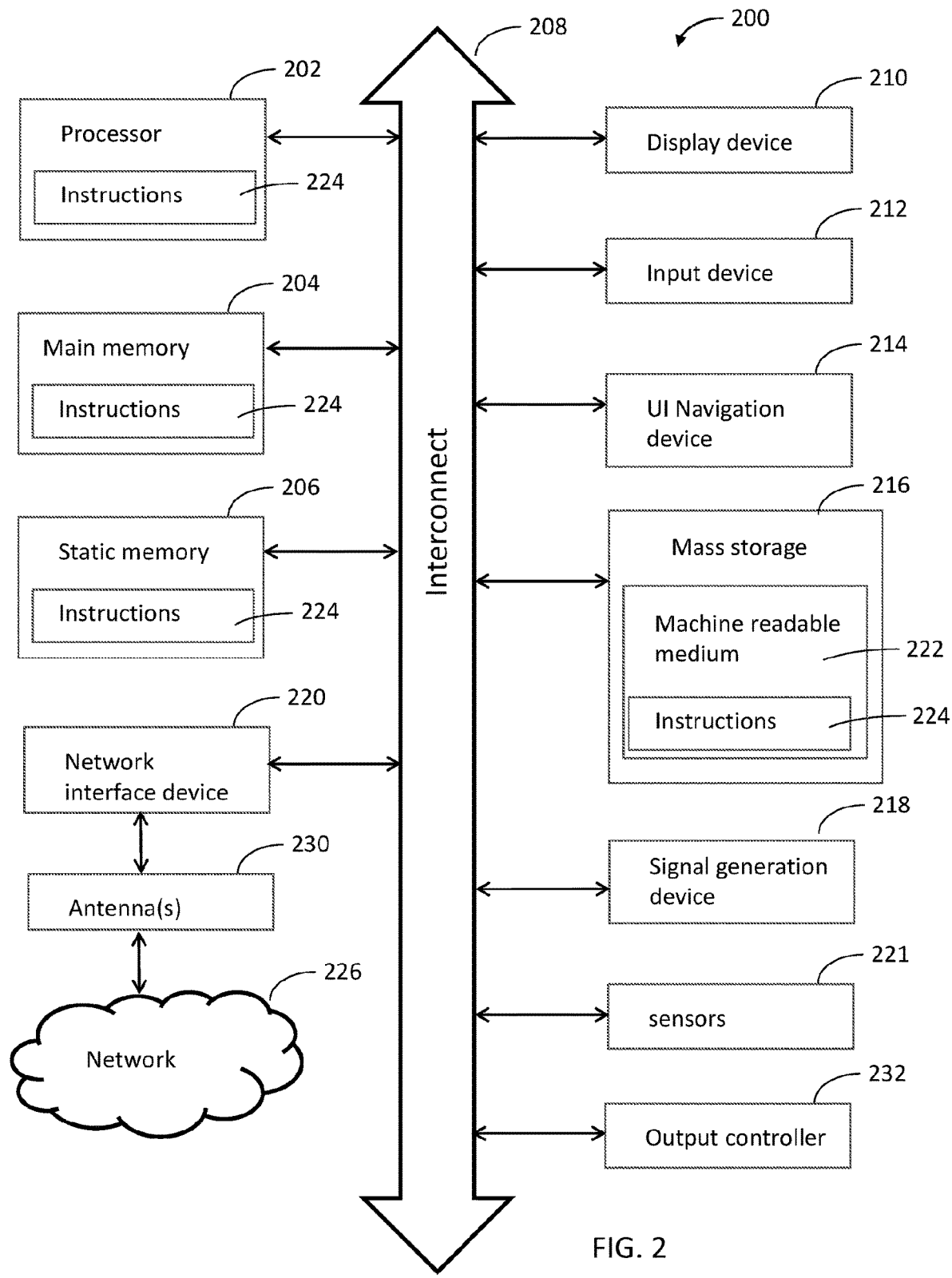
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. The machine 200 may be a UE 102, eNB 104, gNB 105, IAB donor, IAB node, access point (AP), station (STA), user, device, mobile device, base station, another device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include one or more of 210-228.

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
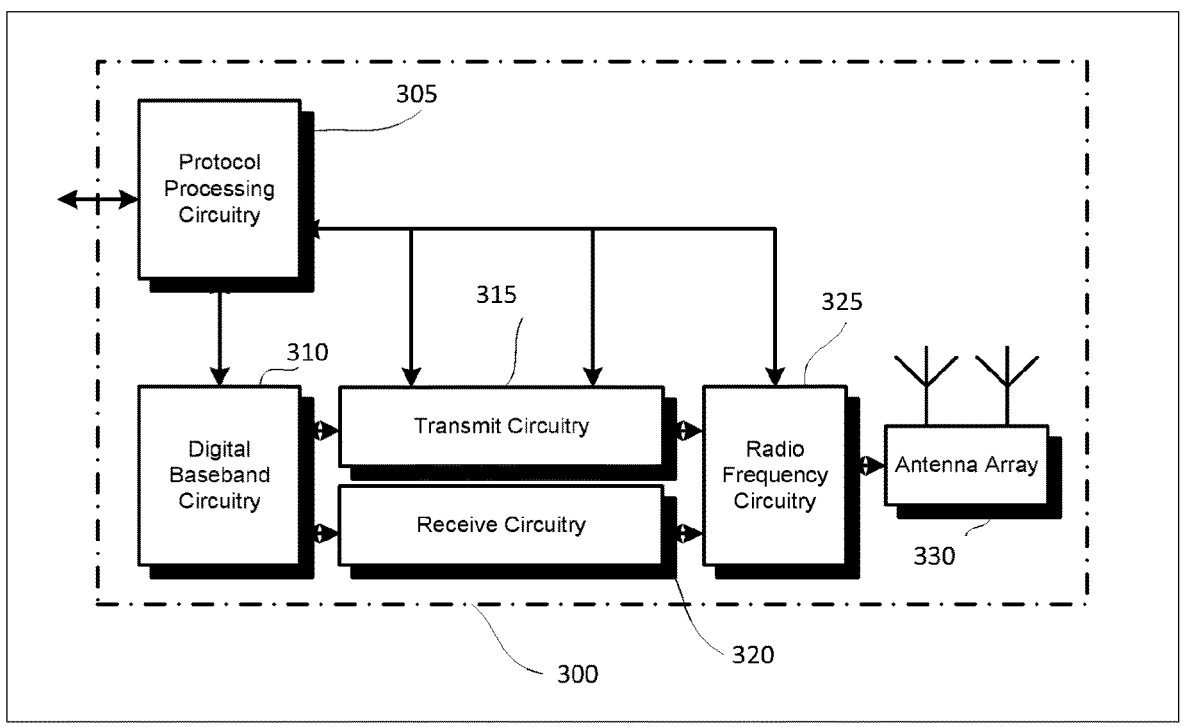
FIG. 3 illustrates an exemplary communication circuitry according to some aspects.

FIG. 3 illustrates an exemplary communication circuitry according to some aspects. It should be noted that a device, such as a UE 102, eNB 104, gNB 105, IAB donor, IAB node, the machine 200 and/or other device may include one or more components of the communication circuitry 300, in some aspects. The communication circuitry 300 may include protocol processing circuitry 305, which may implement one or more of: medium access control (MAC), radio link control (RLC), packet data convergence protocol (PDCP), radio resource control (RRC) and non-access stratum (NAS) functions. The communication circuitry 300 may further include digital baseband circuitry 310, which may implement one or more physical layer (PHY) functions. The communication circuitry 300 may further include transmit circuitry 315, receive circuitry 320 and/or antenna array circuitry 330. The communication circuitry 300 may further include radio frequency (RF) circuitry 325. In an aspect of the disclosure, RF circuitry 325 may include multiple parallel RF chains for one or more of transmit or receive functions, each connected to one or more antennas of the antenna array 330.

In some embodiments, processing circuitry may perform one or more operations described herein and/or other operation(s). In a non-limiting example, the processing circuitry may include one or more components such as the processor 202, protocol processing circuitry 305, digital baseband circuitry 310, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as transmit circuitry 315, receive circuitry 320, radio frequency circuitry 325, similar component(s) and/or other component(s).

Although the UE 102, eNB 104, gNB 105, IAB donor, IAB node, machine 200 and/or other device described herein may each be illustrated as having several separate functional elements, one or more of the functional elements may be combined and may be implemented by combinations of software-configured elements, such as processing elements including digital signal processors (DSPs), one or more microprocessors, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, IAB donor, IAB node, machine 200, and/or other device may include various components shown in FIGS. 2-3 and/or other components. Accordingly, techniques and operations described herein that are performed by a device may be performed by an apparatus of the device, in some embodiments.

Figure 4:
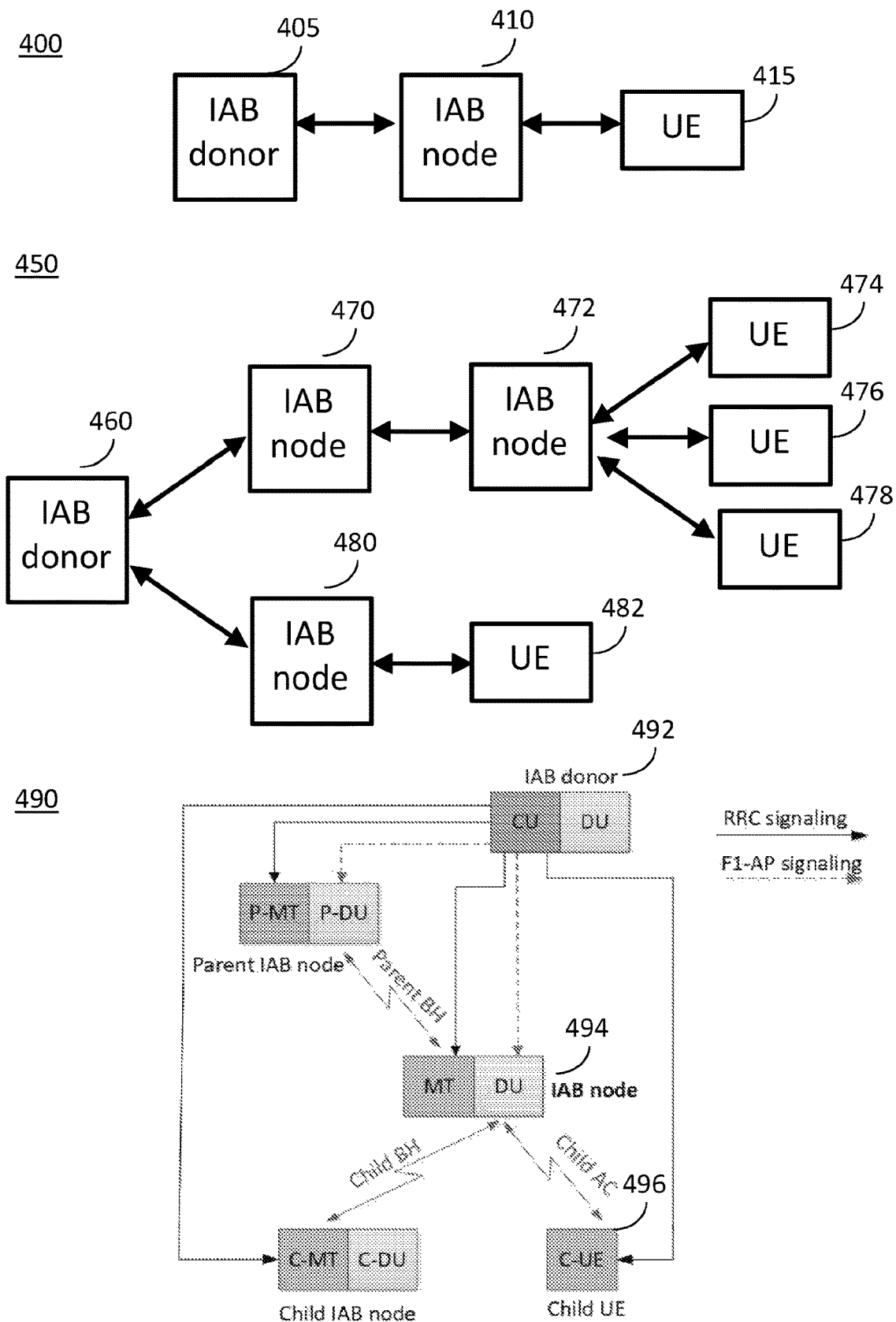
FIG. 4 illustrates example scenarios in accordance with some embodiments.

FIG. 4 illustrates example scenarios in accordance with some embodiments. Embodiments are not limited to the scenarios 400, 450, 490 shown in FIG. 4. Embodiments are also not limited to the number, type, name, arrangement or other aspects of elements (such as the IAB donor 405, IAB nodes 410, UEs 415 and/or other) shown in FIG. 4.

In some embodiments, an integrated access and backhaul (IAB) network may include one or more of the components shown in FIG. 4. Accordingly, the scenarios 400, 450, 490 may be related to IAB networks, although the scope of embodiments is not limited in this respect. One or more of the techniques, operations and/or methods described herein may be performed in accordance with one or more of the scenarios 400, 450, 490, although the scope of embodiments is not limited in this respect. One or more of those techniques, operations and/or methods described herein may be performed in accordance with other scenarios, in some embodiments.

In some embodiments, the IAB donor (such as 405, 460, 492) may be a gNB 105. In some embodiments, the IAB donor (such as 405, 460, 492) may be part of a gNB 105. The scope of embodiments is not limited in this respect however. In some embodiments, the IAB donor 405 may not necessarily be a gNB 105. In some embodiments, the IAB donor 405 may not necessarily be part of a gNB 105.

In the scenario 400, the IAB donor 405 may communicate with the IAB node 410, and the IAB node 410 may communicate with the UE 415. The IAB node 410 may operate as a relay between the IAB donor 405 and the ue 415.

In the scenario 450, multiple IAB nodes 470, 472 are used for communication between the IAB donor 460 and UEs 474, 476, 478. This example may be extended to more than two IAB nodes. In the scenario 450, the IAB node 470 may operate as a relay between the IAB donor 460 and the IAB node 472. Accordingly, the IAB node 470 may forward elements between the IAB donor 405 and the IAB node 472, in some embodiments. The IAB node 472 may operate as a relay between the IAB node 470 and each of the UEs 474, 476, 478. Accordingly, the IAB node 472 may forward elements between the IAB node 470 and each of the UEs 474, 476, 478. This example is not limited to three UEs 474, 476, 478, as the IAB node 472 may operate as a relay for any number of UEs (such as 1, 2, 4, or more UEs).

In the scenario 490, multiple components are shown. It should be noted that some descriptions may include terminology such as "parent IAB node," "child IAB node," and/or "child UE." Some descriptions may include terminology related to "IAB nodes," "IAB donors," and/or "UEs." Embodiments are not limited by the terminology in any of those descriptions. Concepts related to relay between multiple components may be described using some terminology (such as IAB nodes, IAB donors, UEs and/or other), but it is understood that those concepts may be applicable to arrangements that include components such as parent IAB nodes, child IAB nodes, child UEs and/or other. In addition, concepts related to relay between multiple components may be described using some terminology (such as parent IAB nodes, child IAB nodes, child UEs and/or other) but it is understood that those concepts may be applicable to arrangements that include components such as IAB nodes, IAB donors, UEs and/or other.

In accordance with some embodiments, an IAB node 410 of an IAB network may be configured to operate as a relay between an IAB donor 405 of the IAB network and a UE 415. The IAB node 410 may receive, from the IAB donor, first signaling that indicates a first timing advance (TA) offset between the IAB donor 405 and the IAB node 410. The first TA offset may be based on frames exchanged between the IAB donor 405 and the IAB node 410. The IAB node 410 may, based on the first TA offset, adjust a transmit timing of the IAB node 410 to align with a transmit timing of the IAB donor 405. The IAB node 410 may transmit a downlink frame to the UE 415 in accordance with the adjusted transmit timing. The IAB node 410 may receive an uplink frame from the UE 415. The IAB node 410 may determine a second TA offset between the IAB node 410 and the UE 415. The second TA offset may be based on a timing difference between a transmission time of the downlink frame and a reception time of the uplink frame. The IAB node 410 may transmit, to the UE 415, second signaling that indicates the first TA offset and the second TA offset. These embodiments are described in more detail below.

Figure 5:
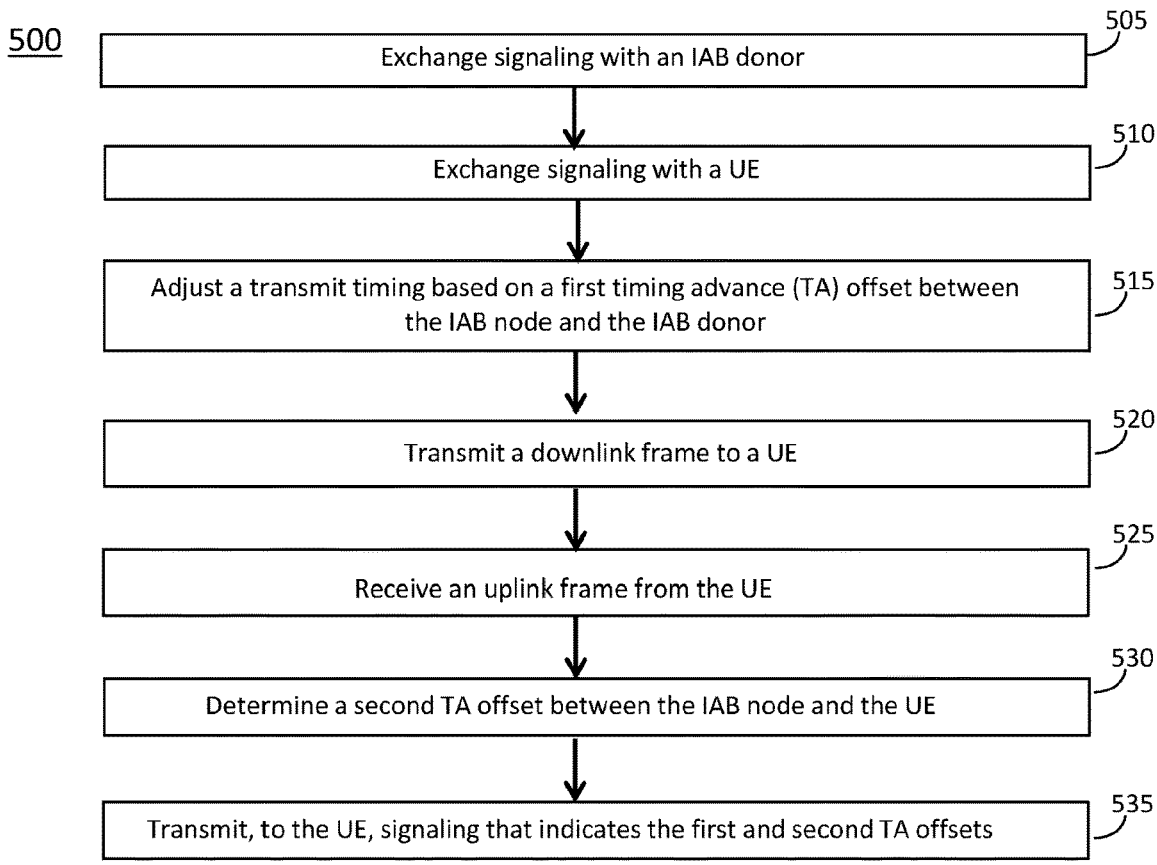
FIG. 5 illustrates the operation of a method of communication in accordance with some embodiments.
Figure 6:
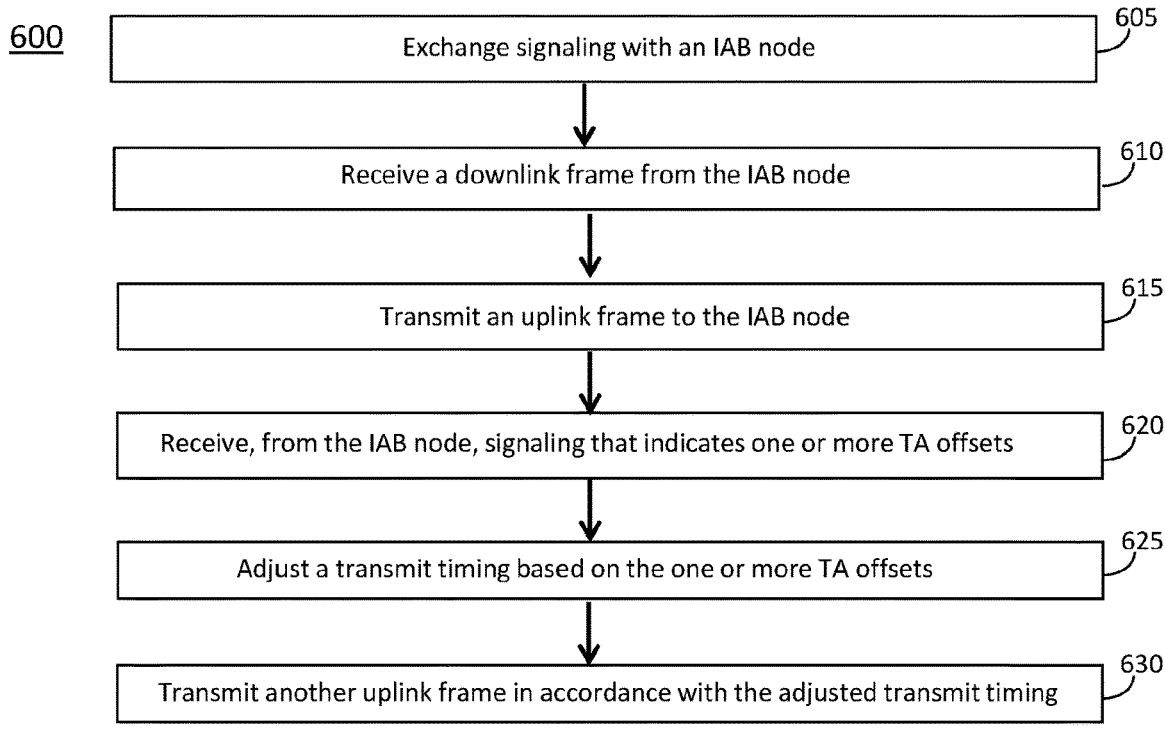
FIG. 6 illustrates the operation of a method of communication in accordance with some embodiments.

FIG. 5 illustrates the operation of a method of communication in accordance with some embodiments. FIG. 6 illustrates the operation of a method of communication in accordance with some embodiments. It is important to note that embodiments of the methods 500, 600 may include additional or even fewer operations or processes in comparison to what is illustrated in FIGS. 5-6. In addition, embodiments of the methods 500, 600 are not necessarily limited to the chronological order that is shown in FIGS. 5-6. In describing the methods 500, 600, reference may be made to one or more figures, although it is understood that the methods 500, 600 may be practiced with any other suitable systems, interfaces and components.

In some embodiments, an IAB node 410 may perform one or more operations of the method 500, but embodiments are not limited to performance of the method 500 and/or operations of it by the IAB node 410. In some embodiments, another device and/or component (such as the gNB 105, eNB 104, IAB donor 405, UE 415, and/or other) may perform one or more operations of the method 500. In some embodiments, another device and/or component (such as the gNB 105, eNB 104, IAB donor 405, UE 415 and/or other) may perform one or more operations that may be similar to, related to and/or reciprocal to one or more operations of the method 500. In a non-limiting example, the IAB donor 405 may perform an operation that may be the same as, similar to, reciprocal to and/or related to an operation of the method 500, in some embodiments. In another non-limiting example, the UE 415 may perform an operation that may be the same as, similar to, reciprocal to and/or related to an operation of the method 500, in some embodiments.

In some embodiments, a UE 415 may perform one or more operations of the method 600, but embodiments are not limited to performance of the method 600 and/or operations of it by the UE 415. In some embodiments, another device and/or component (such as the gNB 105, eNB 104, IAB donor 405, IAB node 410, and/or other) may perform one or more operations of the method 600. In some embodiments, another device and/or component (such as the gNB 105, eNB 104, IAB donor 405, IAB node 410 and/or other) may perform one or more operations that may be similar to, related to and/or reciprocal to one or more operations of the method 600. In a non-limiting example, the IAB node 410 may perform an operation that may be the same as, similar to, reciprocal to and/or related to an operation of the method 600, in some embodiments It should be noted that one or more operations of one method (such as 500, 600 and/or others described herein) may be the same as, similar to, related to and/or reciprocal to one or more operations of another method (such as 500, 600 and/or others described herein). For instance, an operation of the method 500 may be the same as, similar to, related to and/or reciprocal to an operation of the method 600, in some embodiments. In a non-limiting example, an operation of the method 500 may include transmission of an element (such as a frame, block, message and/or other) by the IAB node 410, and an operation of the method 600 may include reception of the same element (and/or similar element) by the UE 415. In some cases, at least some of the descriptions of operations and techniques described as part of one method (such as 500, 600 and/or others described herein) may be relevant to another method (such as 500, 600 and/or others described herein).

The methods 500, 600 and other methods described herein may refer to IAB nodes 410, IAB donors 405, UEs 415 and/or other components operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 500, 600 and other methods described herein may be practiced by wireless devices configured to operate in other suitable types of wireless communication systems, including systems configured to operate according to various IEEE standards such as IEEE 802.11. The methods 500, 600 may also be applicable to an apparatus of an IAB node 410, an apparatus of a UE 415, an apparatus of an IAB donor, an apparatus of a gNB 105 and/or an apparatus of another device described above.

In some embodiments, an apparatus of a device (including but not limited to the IAB node 410, IAB donor 415, UE 415, eNB 104, gNB 105 and/or other) may comprise memory that is configurable to store one or more elements, and the apparatus may use them for performance of one or more operations. The apparatus may include processing circuitry, which may perform one or more operations (including but not limited to operation(s) of one or more methods (such as 500, 600 and/or other methods described herein). The processing circuitry may include a baseband processor. The baseband circuitry and/or the processing circuitry may perform one or more operations described herein. The apparatus may include a transceiver to transmit and/or receive one or more blocks, messages and/or other elements.

Embodiments are not limited by references herein to transmission, reception and/or exchanging of elements such as frames, messages, requests, indicators, signals or other elements. In some embodiments, such an element may be generated, encoded or otherwise processed by processing circuitry for transmission by a transceiver or other component cases. In some embodiments, such an element may be received by a transceiver or other component, and may be decoded, detected or otherwise processed by processing circuitry. In some embodiments, the processing circuitry and the transceiver may be included in a same apparatus. In some embodiments, the transceiver may be separate from the apparatus that comprises the processing circuitry, in some embodiments.

One or more of the elements (such as messages, operations and/or other) described herein may be included in a 3GPP protocol, 3GPP LTE protocol, 4G protocol, 5G protocol, NR protocol and/or other protocol, but embodiments are not limited to usage of those elements. In some embodiments, other elements may be used, including other element (s) in a same standard/protocol, other element(s) in another standard/protocol and/or other. In addition, the scope of embodiments is not limited to usage of elements that are included in standards.

In some embodiments, the IAB donor 405, IAB node 410, and/or UE 415 may be arranged to operate in accordance with a 3GPP protocol, NR protocol, and/or other protocol.

In some embodiments, an IAB node 410 of an IAB network may be configured to operate as a relay between an IAB donor 405 of the IAB network and a UE 415. Some descriptions herein are based on an arrangement in which the IAB node 410 communicates directly with both the UE 415 and the IAB donor 405, and operates as a relay between the UE 415 and the IAB donor 405. It is understood that such descriptions are not limiting, and that embodiments are not limited to this arrangement. For instance, one or more of the techniques, operations and/or methods described herein in terms of the above arrangement may be applicable to other arrangements, such as arrangements that include multiple IAB nodes 410, like scenario 450, scenario 490 and/or other. In a non-limiting example, an IAB node 410 may operate as a relay between the UE 415 and another IAB node 410. In another non-limiting example, an IAB node 410 may operate as a relay between the IAB donor 405 and another IAB node 410.

At operation 505, the IAB node 410 may exchange signaling with the IAB donor 405. Such signaling may include one or more messages. In some embodiments, the IAB node 410 and the IAB donor 405 may exchange signaling multiple times. Such signaling may be exchanged at multiple times throughout the method 500.

At operation 510, the IAB node 410 may exchange signaling with the UE 415. Such signaling may include one or more messages. In some embodiments, the IAB node 410 and the UE 415 may exchange signaling multiple times. Such signaling may be exchanged at multiple times throughout the method 500.

At operation 515, the IAB node 410 may adjust a transmit timing based on a first timing advance (TA) offset between the IAB node 410 and the IAB donor 405. At operation 520, the IAB node 410 may transmit one or more downlink frames to the UE 415. At operation 525, the IAB node 410 may receive one or more uplink frames from the UE 415. At operation 530, the IAB node 410 may determine a second TA offset between the IAB node and the UE 415. At operation 535, the IAB node 410 may transmit, to the UE 415, signaling that indicates the first and second TA offsets.

In some embodiments, the IAB node 410 may receive, from the IAB donor 405, first signaling that indicates a first timing advance (TA) offset between the IAB donor 405 and the IAB node 410. The first TA offset may be based on frames exchanged between the IAB donor 405 and the IAB node 410. The IAB node 410 may, based on the first TA offset, adjust a transmit timing of the IAB node 410 to align with a transmit timing of the IAB donor 405. The IAB node 410 may transmit a downlink frame to the UE 415 in accordance with the adjusted transmit timing. The IAB node 410 may receive an uplink frame from the UE 415. The IAB node 410 may determine a second TA offset between the IAB node 410 and the UE 415. The second TA offset may be based on a timing difference between a transmission time of the downlink frame and a reception time of the uplink frame. The IAB node 410 may transmit, to the UE 415, second signaling that indicates the first TA offset and the second TA offset.

In some embodiments, the IAB node 410 may encode the second signaling to include a number equal to one half of a sum, wherein the sum includes: a term based on a product of the second TA offset, a maximum frequency difference equal to 480 kilohertz (kHz), and the number 4096, and a predetermined constant. Embodiments are not limited to the example numbers given above.

In some embodiments, the IAB node 410 may encode the second signaling to indicate: a difference between the first TA offset and the second TA offset; and the second TA offset.

In some embodiments, the IAB node 410 may encode the second signaling to include one or more of: 1) a first medium access control (MAC) control element (CE), wherein a TA offset field (and/or other field) of the first MAC CE may include the difference between the first TA offset and the second TA offset; and 2) a second MAC CE, wherein a TA offset field of the second MAC CE includes the second TA offset; and 3) one or more other elements.

In some embodiments, the IAB node 410 may encode the second signaling to include a MAC CE. A TA offset field (and/or other field) of the MAC CE may include the difference between the first TA offset and the second TA offset. Another field of the MAC CE may include the second TA offset.

In some embodiments, the IAB node 410 may encode the second signaling to include one or more of: 1) a first random access response (RAR) message that may include the difference between the first TA offset and the second TA offset; 2) a second RAR message that may include the second TA offset; and 3) one or more other elements.

In some embodiments, the IAB node 410 may encode the second signaling to include an RAR message that includes one or more of: 1) the difference between the first TA offset and the second TA offset, 2) the second TA offset, and 3) one or more other elements.

In some embodiments, the first signaling may be included in an RAR message received from the IAB donor 405 during a random access channel (RACH) procedure. In some embodiments, the first signaling may be included in a MAC CE received from the IAB donor 405 while the IAB node 410 operates in a radio resource control (RRC) connected mode.

In some embodiments, the first signaling may indicate the first TA offset scaled by a number that is equal to a product of a maximum frequency difference equal to 480 kilohertz (kHz) and the number 4096. Embodiments are not limited to the example numbers given above.

In some embodiments, the IAB node 410 may operate as a relay between the IAB donor 405 and a plurality of UEs 415. The IAB node 410 may, for each of the UEs 415 of the plurality of UEs 415, perform one or more of: 1) determine a TA offset between the IAB node 410 and the UE 415; 2) transmit, to the UE 415, signaling that indicates the TA offset between the IAB node 410 and the UE 415; and 3) one or more other operations. In some embodiments, the IAB node 410 may transmit the signaling to each of the UEs 415 to align timing of the IAB node 410 with timing of each UE 415 of the plurality of UEs 415.

In some embodiments, the IAB node 410 may comprise a Mobile Terminating (MT) unit and a distributed unit (DU). The first signaling may be received at the MT unit from a central unit (CU) of the IAB donor 405. The second signaling may be transmitted from the DU to the UE 415.

In some embodiments, an IAB network may comprise an IAB donor 405 and a plurality of IAB nodes 410 to operate as relays between the IAB donor 405 and a plurality of UEs 415. An IAB node 410 may receive first signaling that indicates a first TA offset between the IAB donor 405 and the IAB node 410. The IAB node 410 may adjust a transmit timing based on the first TA offset. The IAB node 410 may transmit a downlink frame to another IAB node 410 in accordance with the adjusted transmit timing. The other IAB node 410 may operate as a relay between the IAB node 410 and a UE 415. The IAB node 410 may receive an uplink frame from the other IAB node 410. The IAB node 410 may determine a second TA offset between the IAB node 410 and another IAB node 410 based on frames exchanged between the IAB node 410 and the other IAB node 410. The IAB node 410 may transmit, to the other IAB node 410, second signaling that indicates the first TA offset and the second TA offset. The IAB node 410 may receive a frame from the IAB donor 405, wherein the frame may be intended for the UE 415 for which the other IAB node 410 operates as a relay. The IAB node 410 may forward the frame to the other IAB node 410 for forwarding to the UE 415.

At operation 605, the UE 415 may exchange signaling with the IAB node 410. At operation 610, the UE 415 may receive one or more downlink frames from the IAB node 410. At operation 615, the UE 415 may transmit one or more uplink frames to the IAB node 410. At operation 620, the UE 415 may receive, from the IAB node 410, signaling that indicates one or more TA offsets. At operation 625, the UE 415 may adjust a transmit timing based on the one or more TA offsets. At operation 630, the UE 415 may transmit one or more uplink frames in accordance with the adjusted transmit timing.

In some embodiments, the UE 415 may receive a downlink frame from an IAB node 410 of an IAB network. The IAB node 410 may be configured to operate as a relay between an IAB donor 405 of the IAB network and the UE 415. The UE 415 may transmit an uplink frame to the IAB node 410. The UE 415 may receive, from the IAB node 410, signaling that indicates one or more of: 1) a difference between a first TA offset (between the IAB donor 405 and the IAB node 410) and a second TA offset (between the IAB node 410 and the UE 415); 2) the second TA offset (between the IAB node 410 and the UE 415); and 3) one or more other elements. The UE 415 may adjust a transmit timing of the UE 415 based on the first and second TA offsets. The UE 415 may transmit another uplink frame to the IAB node 410 for forwarding to the IAB donor 405. The UE 415 may encode the other uplink frame for transmission in accordance with the adjusted transmit timing.

In some embodiments, the signaling from the IAB node 410 may include: 1) a MAC CE that indicates the first and second TA offsets, or 2) a first MAC CE that indicates the first TA offset and a second MAC CE that indicates the second TA offset.

In some embodiments, the signaling from the IAB node 410 may include: 1) an RAR message that indicates the first and second TA offsets, or 2) a first RAR message that indicates the first TA offset and a second RAR message that indicates the second TA offset.

Figure 7:
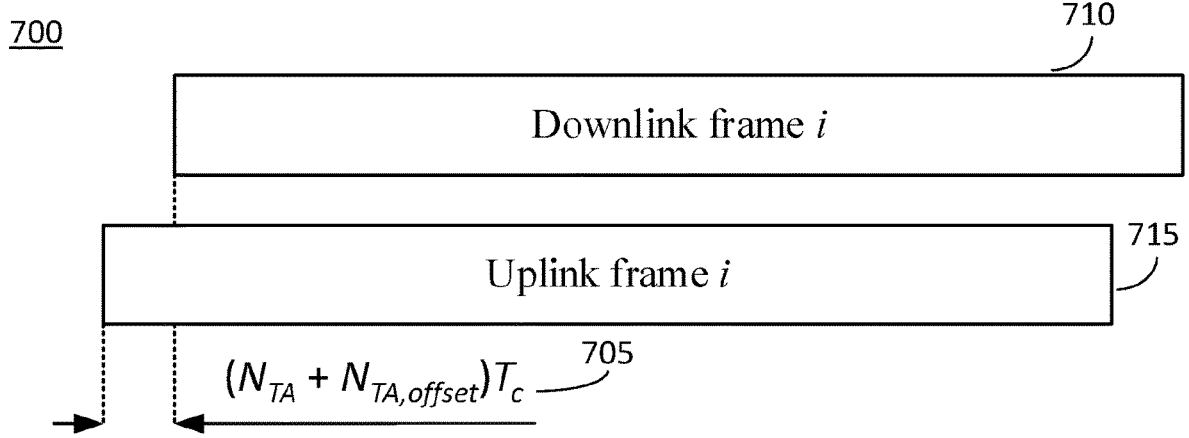
FIG. 7 illustrates example frames that may be exchanged in accordance with some embodiments.
Figure 8:
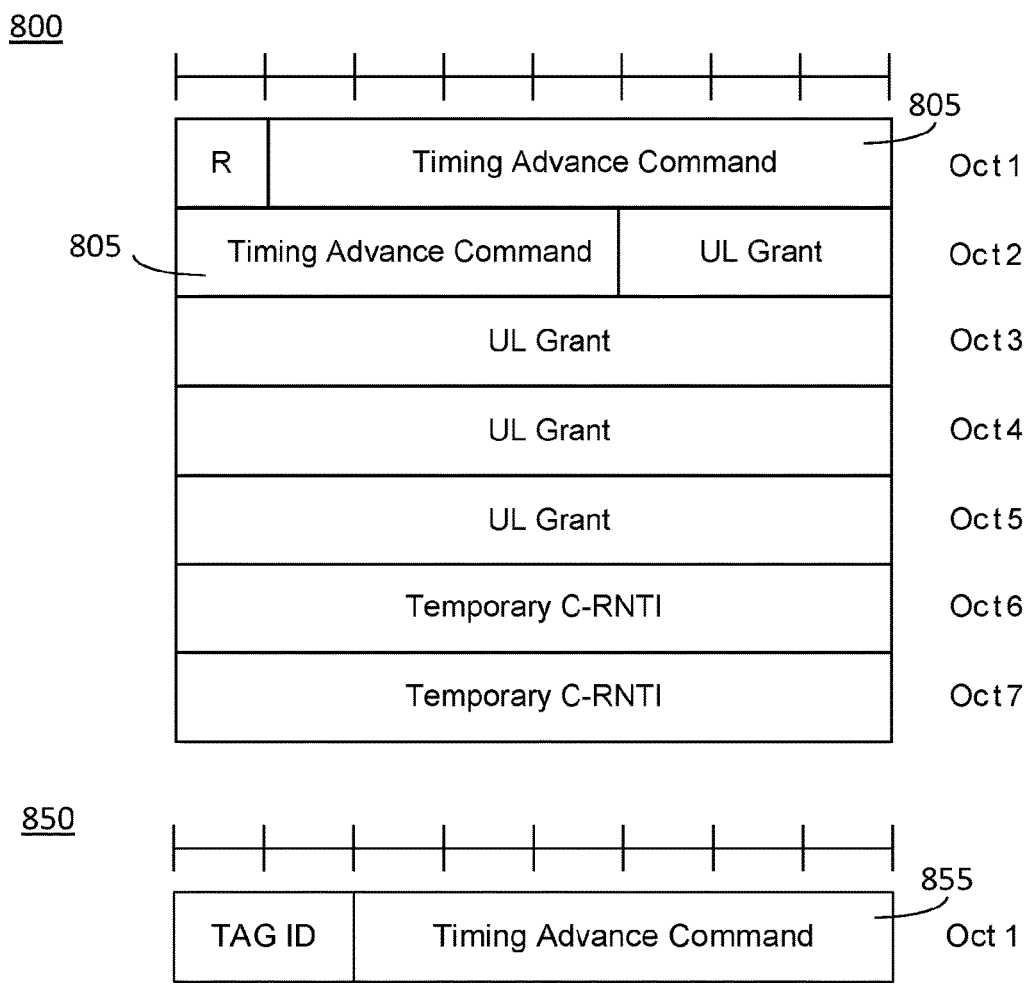
FIG. 8 illustrates example messages related to timing advance (TA) offset in accordance with some embodiments.
Figure 13:
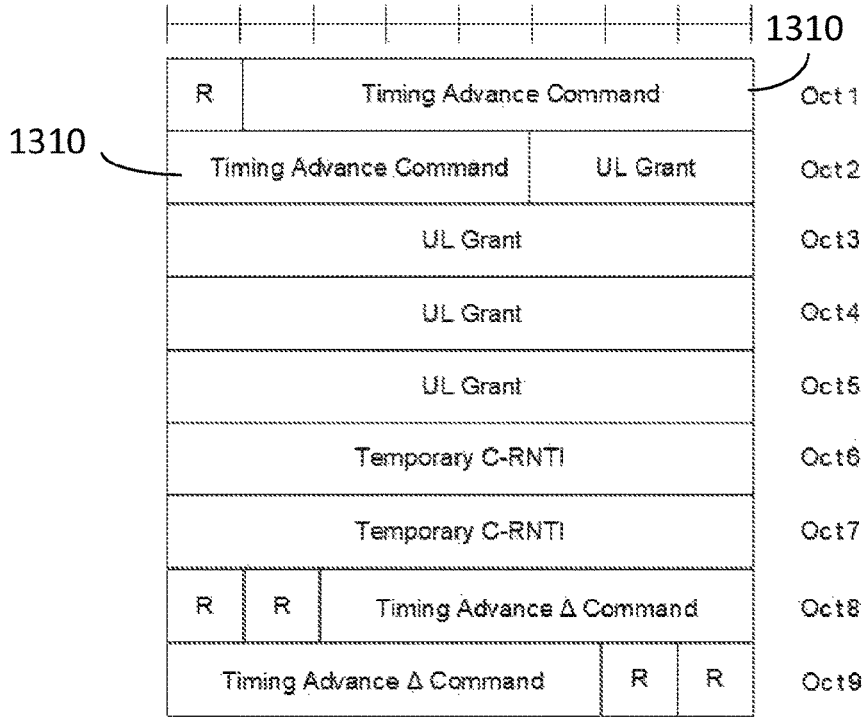
FIG. 13 illustrates example messages related to TA offset in accordance with some embodiments.
Figure 13:
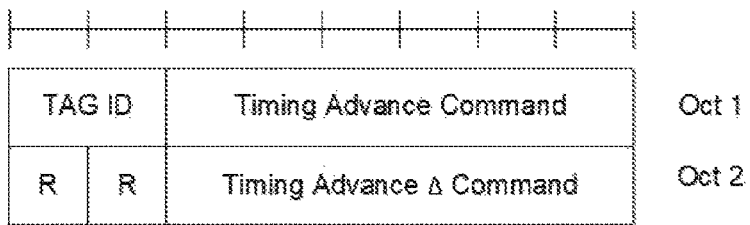
Figure 13:
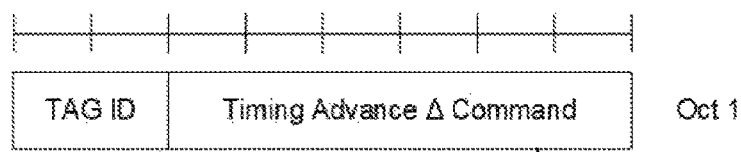

FIG. 7 illustrates example frames that may be exchanged in accordance with some embodiments. FIG. 8 illustrates example messages related to timing advance (TA) offset in accordance with some embodiments. FIGS. 9-12 illustrate examples of alignment of frames in accordance with some embodiments. FIG. 13 illustrates example messages related to TA offset in accordance with some embodiments. It should be noted that the examples shown in FIGS. 7-13 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 7-13. Although some of the elements shown in the examples of FIGS. 7-13 may be included in a 3GPP standard, NR standard, 5G standard and/or other standard, embodiments are not limited to usage of such elements that are included in standards.

Some embodiments may relate to timing advance signaling (including but not limited to additional timing advance signaling) in 5G-NR IAB. In current Integrated Access and Backhaul (IAB) study, timing advance (TA) based synchronization between IAB nodes is supported and there may be at least two timing and synchronization options. In these two options, DL Tx timing and UL Rx timing may not be aligned at an IAB node. Hence, the TA value in IAB should take the misalignment TA Δ into consideration.

Since the child IAB node needs to know the original defined TA (not consider the DL Tx and UL Rx misalignment) to properly set its own DL Tx timing to be aligned with its parent node, we cannot just indicate an overall TA value (including the misalignment TA Δ) using current NR Rel-15 specifications. Hence, additional TA signaling needs to be defined in IAB.

In 5G new radio (NR) current Release 15 specifications, TA command transmitted from a base station is defined in MAC RAR during initial access and in MAC CE during connected mode. This TA command can indicate an $N_{TA}$ value (initial value and updated value) for UL Tx timing calculation.

In some cases, in an IAB network, an IAB child node and a UE 102 may need to know not only the $N_{TA}$ value, but also an $N_{TA,\Delta}$ value which indicates the DL Tx timing and UL Rx timing misalignment at its parent IAB node. In addition, IAB cannot just transmit the $N_{TA}-N_{TA,\Delta}$ value using current Release 15 TA command, since the IAB child node needs to also know $N_{TA}$ value individually to properly set its own DL Tx timing such that it can be aligned with its parent node. Hence, current Release 15 TA command cannot fulfil the TA requirements of IAB network.

In some embodiments, when DL Tx timing and UL Rx timing are not aligned at an IAB node, one or more schemes for TA indication in IAB network may be used (which may include new signaling needed to child IAB nodes, in some cases). Different methods for the new signaling transmission during initial access and in connected mode may be used. Techniques to calculate the misalignment time for different methods may also be used.

In 5G new radio (NR) current Release 15 specifications, Timing Advance (TA) is an offset at the user equipment (UE), between the start of a downlink (DL) frame at the UE and the start of uplink (UL) frame transmission from the UE, defined as $T_{TA}=(N_{TA}+N_{TA,offset})T_c$ in TS38.211. A non-limiting example in FIG. 7 shows a TA offset (indicated by 705) between downlink frame 710 and uplink frame 715.

For the TA value of $T_{TA}=(N_{TA} N_{TA,offset})T_c$, one or more of the following may be applicable: 1) $T_c=1/(\Delta f_{max}*N_f)$, wherein $\Delta f_{max}=480$ kHz and $N_f=4096$, which means that $T_c=0.509$ nano-seconds (nsec); 2) the value of $N_{TA,offset}$ depends on the duplex mode of the cell in which the uplink transmission takes place and the frequency range (FR) and is defined in TS38.133 Table 7.1.2-2; 3) the value of $N_{TA}$ can be indicated from the base station to the UE 102 using two different Medium Access Control (MAC) layer command.

In some embodiments, a TA Command in MAC Random Access Response (RAR) may be used. This is the case that during initial access, the base station estimates the initial TA from Physical Random Access Channel (PRACH) and sends TA Command 805 in RAR 800. The payload of MAC RAR is shown in FIG. 8. The size of the TA Command field is 12 bits. As described in TS38.213, with the MAC RAR TA Command, it indicates an index value of $T_A=0, 1, 2, \ldots, 3846$. For subcarrier spacing of $2^\mu*15$ kHz, the $N_{TA}$ value can be calculated as $N_{TA}=T_A*16*64/2^\mu$.

In some embodiments, a TA Command in MAC Control Element (CE) may be used. After the UE 102 is in connected mode, the base station keep estimating TA and sends TA Command in MAC CE to the UE 102, if TA correction is required. In this case, the TA Command 855 is transmitted in MAC CE 850 as shown in FIG. 8. The size of the TA Command field is 6 bits. With the MAC CE TA Command, it indicates an index value of $T_A=0, 1, 2, \ldots, 63$. For subcarrier spacing of it indicates an index value of $T_A=0, 1, 2, \ldots, 3846$. For a subcarrier spacing of $2^\mu*15$ kHz, with a current $N_{TA}$ value, $N_{TA\_old}$, the new $N_{TA}$ value, $N_{TA\_new}$, can be calculated as $N_{TA\_new}=N_{TA\_old}+(T_A-31)*16*64/2^\mu$.

Figure 9:
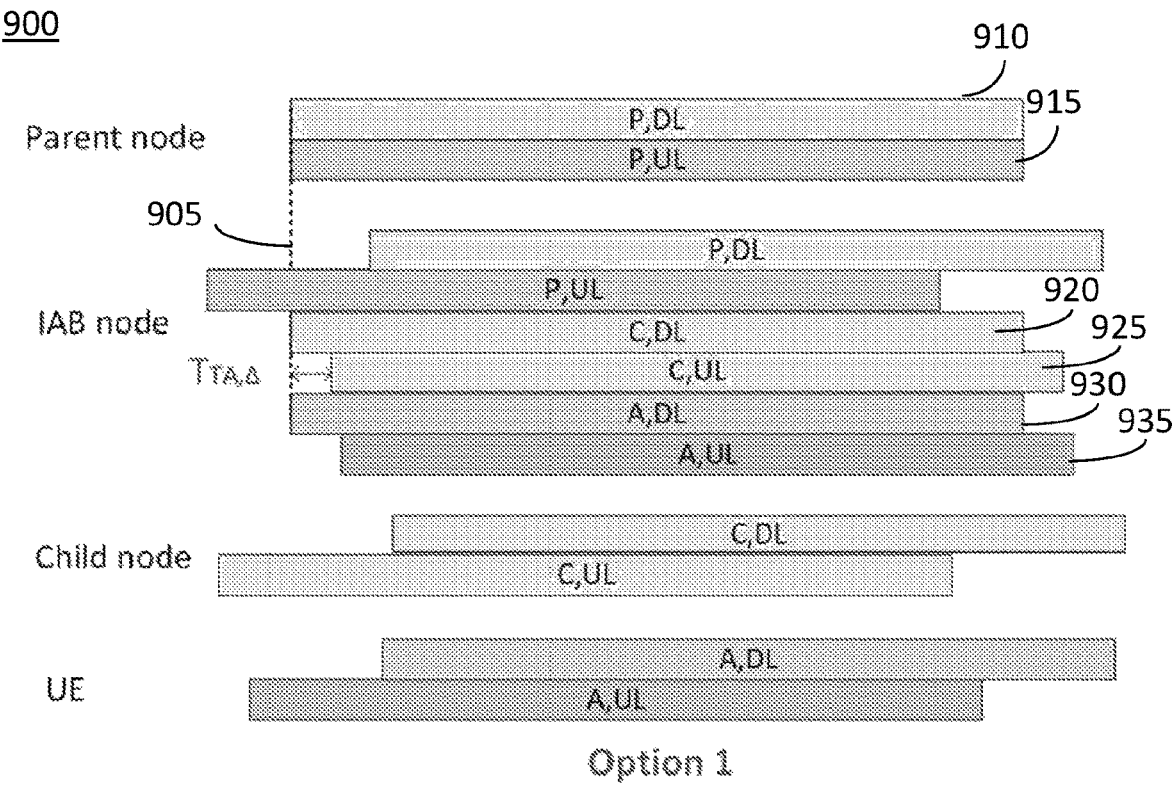
FIG. 9 illustrates examples of alignment of frames in accordance with some embodiments.
Figure 9:
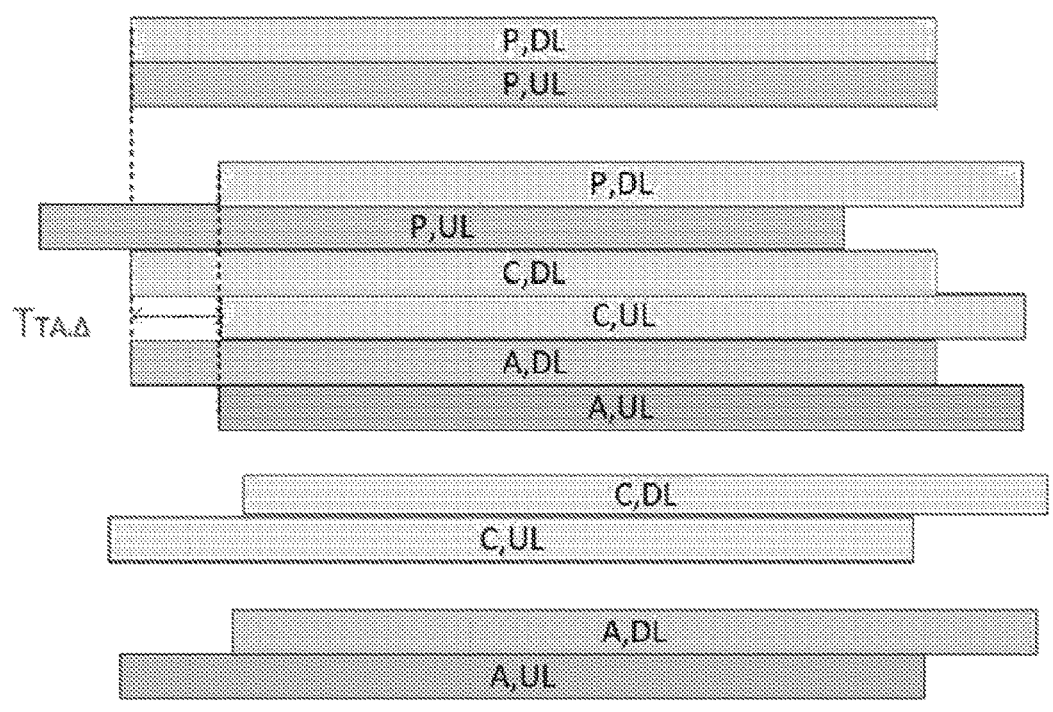

In some embodiments, in an IAB network, an IAB node 410 can connect to its parent node (an IAB donor 405 or another IAB node 410) through parent backhaul (BH) link; connect to a UE 415 through access (AC) link; and connect to its child IAB node through child backhaul link. In some cases, TA-based synchronization between IAB nodes 410 is supported. There are at least two timing and synchronization options. In "Option 1," DL transmission timing alignment across IAB nodes 410 and donor nodes is used. In "Option 2," the DL transmission timing for all IAB nodes 410 is aligned with the parent IAB node or donor DL timing, and UL reception timing of an IAB node 410 can be aligned with the IAB node's 410 DL reception timing. These two options (option 1 as 900, and option 2 as 950) are shown in FIG. 9, wherein alignment is indicated by 905. In 900, P,DL/P,UL (indicated by 910, 915 in 900) represent parent backhaul DL/UL; C,DL/C,UL (indicated by 920, 925 in 900) represent child backhaul DL/UL; and A,DL/A,UL (indicated by 930, 935 in 900) represent access DL/UL. Similar elements are shown for option 2 in 950.

In these two options, DL Tx timing and UL Rx timing may not be aligned at an IAB node 410, for example, there may be a $T_{TA,\Delta}$ time misalignment. Hence, the TA value at its child nodes should be $T_{TA,IAB}=(N_{TA}-N_{TA,\Delta}+N_{TA,offset})*T_c$, wherein $T_{TA,\Delta}=N_{TA,\Delta}*T_c$.

In some embodiments, an IAB child node 410 and a UE 415 may need to know not only the $N_{TA}$ value, but also an $N_{TA,\Delta}$ value which indicates the DL Tx timing and UL Rx timing misalignment at its parent IAB node 410. In addition, IAB cannot just transmit the $N_{TA}-N_{TA,\Delta}$ value using current Release 15 TA command, since the IAB child node needs to also know $N_{TA}$ value individually to properly set its own DL Tx timing such that it can be aligned with its parent node. Hence, current Release 15 TA command cannot fulfill the TA requirements of IAB network and additional TA signaling needs to be defined in IAB.

Figure 10:
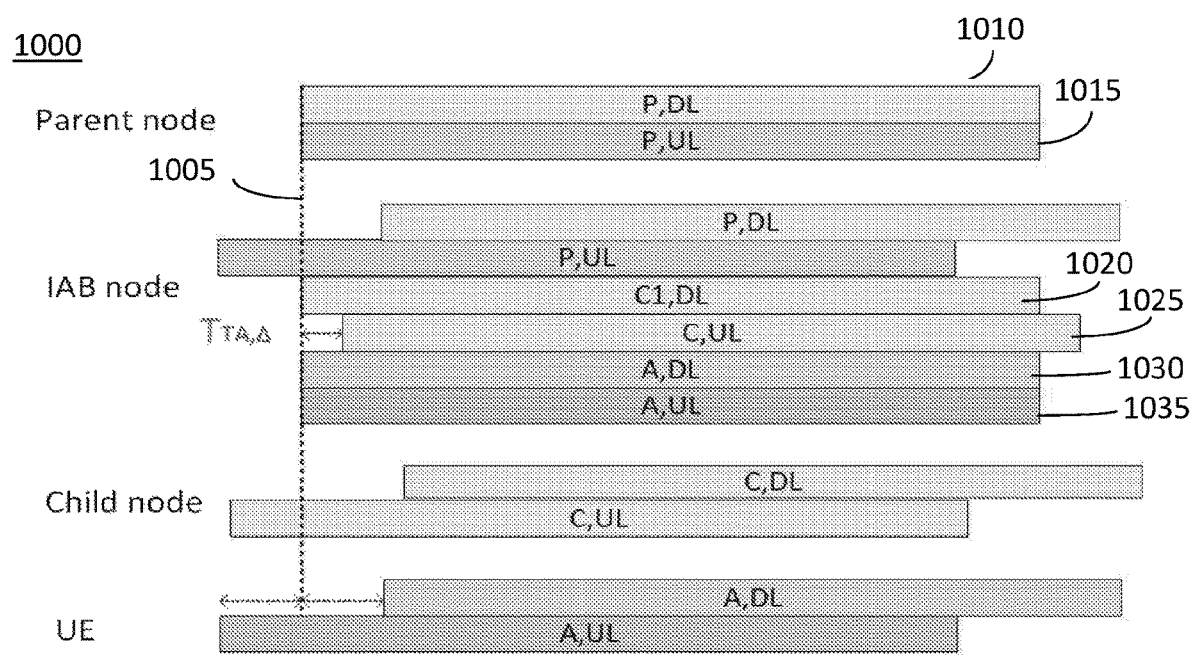
FIG. 10 illustrates an example of alignment of frames in accordance with some embodiments.
Figure 11:
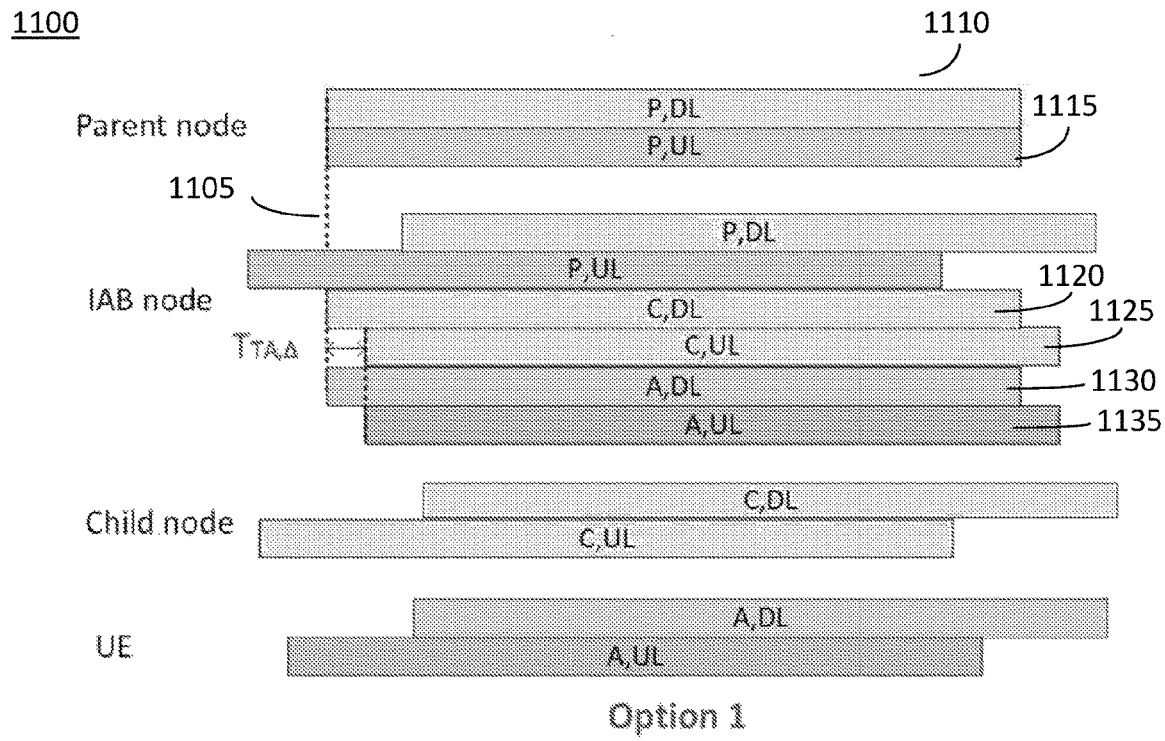
FIG. 11 illustrates an example of alignment of frames in accordance with some embodiments.
Figure 12:
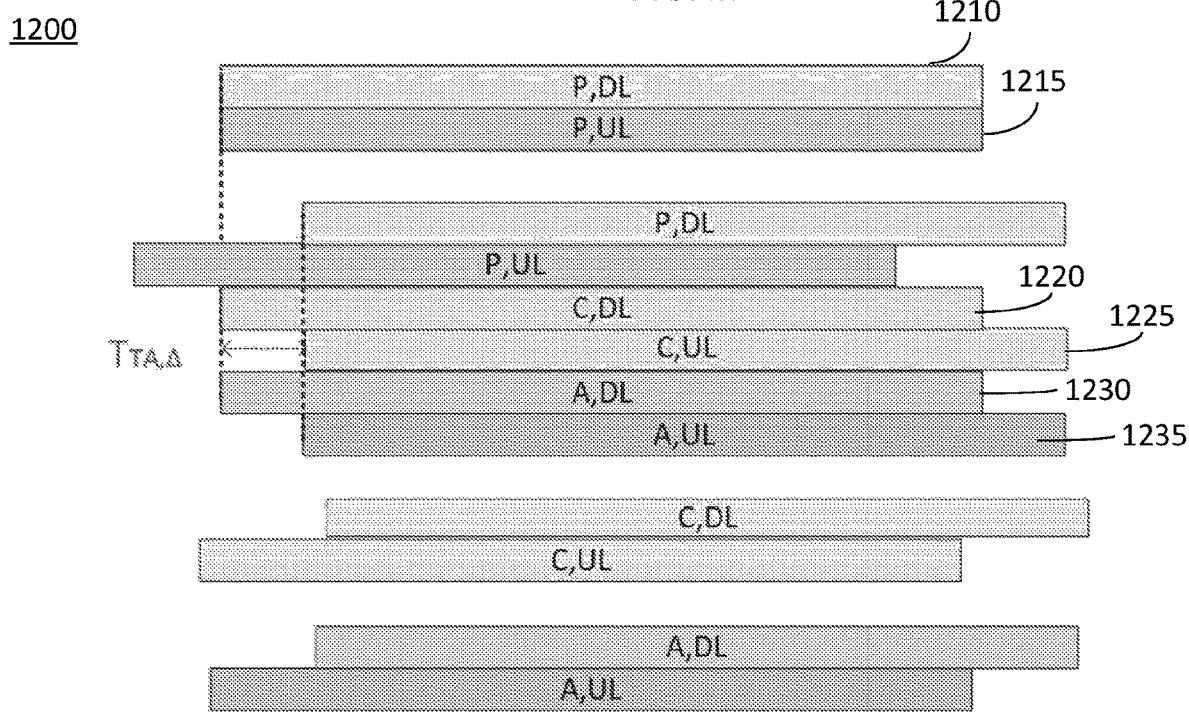
FIG. 12 illustrates an example of alignment of frames in accordance with some embodiments.

In some embodiments, additional TA signaling for IAB may be used. Two methods are disclosed for additional TA signaling transmission when DL Tx and UL Rx timing not aligned at an IAB node. In method 1, indication of $N_{TA}$ for child IAB nodes and child UEs in current NR Rel-15 TA command may be used; indication of $N_{TA,\Delta}$ for child IAB nodes with new signaling may be used. In method 1, $N_{TA}$ values are indicated to child IAB nodes and child UEs respectively, the same way in current NR Rel-15 TA command of MAC RAR and MAC CE as if there is no DL Tx timing and UL Rx timing misalignment at an IAB node. In addition, new signaling to indicate $N_{TA,\Delta}$ to a child IAB node may be performed. With this method, access UL Rx timing will be aligned with DL Tx timing in an IAB node; while child IAB UL Rx timing will not be aligned with access UL Rx timing and DL Tx timing. But all child IAB UL Rx timing will be aligned with each other. Since IAB TA Option 2 requires access UL Rx timing and child IAB UL Rx timing alignment, the method 1 may not necessarily work for IAB TA Option 2. Method 1 is illustrated in FIG. 10 for IAB TA Option 1. Alignment is indicated by 1005. Elements 1010-1035 are defined in a similar manner as corresponding elements 910-935 in 900 of FIG. 9. A potential drawback of method 1 is that in an IAB node 410, the UL Rx timing from child IAB nodes and child UEs are not aligned. An IAB node 410 may need to maintain multiple Rx timing.

In method 2, indication of $(N_{TA}-N_{TA,\Delta})$ for child IAB nodes and child UEs in current NR Rel-15 TA command may be used; indication of $N_{TA,\Delta}$ for child IAB nodes with new signaling may be used. In method 2, $(N_{TA}-N_{TA,\Delta})$ values are indicated to child IAB nodes and child UEs respectively, with current NR Rel-15 TA command of MAC RAR and MAC CE. Note that since $(N_{TA}-N_{TA,\Delta})$ values can be negative, Rel-15 TA command of MAC RAR can be extended to signal negative TA value. A simple way is to add a "sign" indicator in the TA command of MAC RAR. Additional signaling is transmitted to indicate $N_{TA,\Delta}$ to a child IAB node. Accordingly, a child IAB node can find out its $N_{TA}$ to properly set its own DL Tx timing in order to be aligned with its parent DL Tx timing. In method 2, all UL Rx timing will be aligned, including access UL Rx timing and all child IAB UL Rx timing. But all UL Rx timing will not be aligned with DL Tx timing in an IAB node 410. For IAB TA Option 2, this UL Rx timing is further aligned to parent DL Rx timing. Method 1 is illustrated for option 1 in FIG. 11 (with elements 1110-1135 defined in a similar manner as corresponding elements 910-935 in 900 of FIG. 9). Method 1 is illustrated for option 2 in FIG. 12 (with elements 1210-1235 defined in a similar manner as corresponding elements 910-935 in 900 of FIG. 9).

In some embodiments, methods for the new signaling transmission to indicate $N_{TA,\Delta}$ to a child IAB node may be used. In some cases (referred to for clarity as "case 1"), indication of $N_{TA,\Delta}$ to a child IAB node in TA Command in MAC RAR during initial access is performed. In "Method 1-1," new fields are added to current MAC RAR. In "Method 1-2," a new MAC RAR is defined. In some cases (referred to for clarity as "case 2"), $N_{TA,\Delta}$ is indicated to a child IAB node in TA Command in MAC CE when TA correction is needed. In "Method 2-1," new fields are added to current TA MAC CE. In "Method 2-2," a new MAC CE is defined. Additional details of Method 1-1, Method 1-2, Method 2-1 and Method 2-2 are described below. In those descriptions, the range of $N_{TA,\Delta}$ is chosen as the same as current TA range in Rel-15, although the scope of embodiments is not limited in this respect. Other ranges of $N_{TA,\Delta}$ may also be possible and the exact number of bits in MAC RAR and MAC CE may depend on one or more factors, including but not limited to a range of $N_{TA,\Delta}$.

Some embodiments are related to Method 1-1, wherein new fields are added to current MAC RAR. A non-limiting example 1300 of method 1-1 is illustrated in FIG. 13. A 12-bit Timing Advance A Command field 1310 is added in October 8-9 in current MAC RAR. It indicates an index value of $T_{TA,\Delta}=0, 1, 2, \ldots, 3846$. For subcarrier spacing of $2^\mu*15$ kHz, the $N_{TA,\Delta}$ value can be calculated as $N_{TA,\Delta}=T_{TA,\Delta}*16*64/2^\mu$. The $N_{TA}$ value indicated by MAC RAR October 1-2 may be calculated the same way as Rel-15 specification, although the scope of embodiments is not limited in this respect. The IAB TA value $T_{TA,IAB}$ may be calculated accordingly.

Some embodiments are related to Method 1-2, wherein a new MAC RAR is defined. A 12-bit Timing Advance A Command field is used. It indicates an index value of $T_{TA,\Delta}=0, 1, 2, \ldots, 3846$. For subcarrier spacing of $2^\mu*15$ kHz, the $N_{TA,\Delta}$ value can be calculated as $N_{TA,\Delta}=T_{TA,\Delta}*16*64/2^\mu$.

Some embodiments are related to Method 2-1, wherein new fields may be added to a current TA MAC CE. A non-limiting example of Method 2-1 is illustrated as 1320 in FIG. 13. A 6-bit Timing Advance A Command field 1325 is added in October 2 in current TA MAC CE. It indicates an index value of $T_{TA,\Delta}=0, 1, 2, \ldots, 63$. For subcarrier spacing of $2^\mu*15$ kHz, with a current $N_{TA,\Delta}$ value, $N_{TA,\Delta}$ (old), the new $N_{TA,\Delta}$ value, $N_{TA,\Delta}$ (new), can be calculated as $N_{TA,\Delta}$ (new)=$N_{TA,\Delta}$ (old)+$(T_{TA,\Delta}-31)*16*64/2^\mu$.

Some embodiments are related to Method 2-2, wherein a new TA Δ MAC CE is defined to indicate $N_{TA,\Delta}$ to a child IAB node, as illustrated in 1340 in FIG. 13. The 2-bit TAG ID may be defined the same way as TA MAC CE in Rel-15 specification, although the scope of embodiments is not limited in this respect. The 6-bit Timing Advance A Command field 1345 in the new TA Δ MAC CE 1340 indicates an index value of $T_{TA,\Delta}=0, 1, 2, \ldots, 63$. For subcarrier spacing of $2^\mu*15$ kHz, with a current $N_{TA,\Delta}$ value, $N_{TA,\Delta}$ (old), the new $N_{TA,\Delta}$ value, $N_{TA,\Delta}$ (new), can be calculated as $N_{TA,\Delta}$ (new)=$N_{TA,\Delta}$ (old)+$(T_{TA,\Delta}-31)*16*64/2^\mu$.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A processor configured to cause an Integrated Access and Backhaul (IAB) node of an IAB network, the IAB node operating as a relay between an IAB donor of the IAB network and a User Equipment (UE), to:
  decode, from the IAB donor, first signaling that includes a first index value for a first timing offset value used by the IAB node in determining uplink timing for transmission to the IAB donor;
  decode, from the IAB donor, second signaling that includes a second index value for a second timing offset;
  based on the first timing offset and the second timing offset, determine a downlink transmit timing of the IAB node; and
  encode a downlink communication for transmission to the UE in accordance with the determined transmit timing.

2. The processor of claim 1, wherein
  a time difference between the start of a downlink frame at the UE and the start of an uplink frame from the UE is based on the first timing offset.

3. The processor of claim 1, wherein the
  first and second signaling are medium access control (MAC) control elements (CEs).

4. The processor of claim 1, wherein the processor is further configured to:
  determine the first timing offset value $N_{TA}$ from the formula $N_{TA}=T_A \cdot 16 \cdot 64/2^\mu$, wherein $2^\mu \cdot 15$ kHz is the subcarrier spacing and $T_A$ is the first index value.

5. The processor of claim 1, wherein the processor is further configured to:
  determine the second timing offset value $N_{TA,\Delta}$ from the formula $N_{TA,\Delta}=T_{A,\Delta} \cdot 16 \cdot 64/2^\mu$, wherein $2^\mu \cdot 15$ khz is the subcarrier spacing and $T_{A,\Delta}$ is the first index value.

6. The processor of claim 1, wherein the is further configured to:
  determine a downlink transmit timing of the IAB node by multiplying a sum of three terms by Tc=0.509 nanoseconds, wherein:
  a first term of the three terms is based on the first timing offset;
  a second term of the three terms is based on the second timing offset; and
  a third term of the three terms is based on a frequency range (FR).

7. The processor of claim 1, wherein
  the second index value is received in a IAB timing advance delta medium access control (MAC) control element (CE).

8. The processor of claim 1, wherein the processor is further configured to:
  encode the downlink communication as part of a random access response (RAR) message.

9. The processor of claim 1, wherein the first signaling is included in a medium access control (MAC) control element (CE) received from the IAB donor while the IAB node operates in a radio resource control (RRC) connected mode.

10. The processor of claim 1, wherein:
  the IAB node operates as a relay between the IAB donor and a plurality of UEs, the processor is further configured to, for each of the UEs of the plurality of UEs:
    determine a Timing Advance (TA) offset between the IAB node and the UE; and
    encode, for transmission to the UE, signaling that indicates the TA offset between the IAB node and the UE,
  wherein the processor is configured to transmit the signaling to each of the UEs to align timing of the IAB node with timing of each UE of the plurality of UEs.

11. The processor of claim 1, wherein:
  the IAB node comprises a Mobile Terminating (MT) unit and a Distributed Unit (DU), the first and second signaling are received at the MT unit from a Distributed Unit (DU) of the IAB donor.

12. The processor of claim 1, wherein:
  the processor is a baseband processor to decode the signaling.

13. The processor of claim 1, wherein the processor is further configured to:
  derive the first and second timing offsets differently from the first and second signaling.

14. A non-transitory computer-readable storage medium storing program instructions executable by processor of an Integrated Access and Backhaul (IAB) node of an IAB network, wherein the IAB network comprises an IAB donor and a plurality of IAB nodes to operate as relays between the IAB donor and a plurality of User Equipment (UEs), the program instructions executable to configure the processor to:
  decode first signaling that includes a first index value for a first timing offset value used by the IAB node in determining uplink timing for transmission to the IAB donor;
  decode, from the IAB donor, second signaling that includes a second index value for a second timing offset;
  determine, based on the first timing offset and the second timing offset, a downlink transmit timing of the IAB node;

encode a downlink communication for transmission to the UE in accordance with the determined transmit timing.

15. The non-transitory computer-readable storage medium of claim 14, wherein the program instructions are further executable to configure the processor to:
determine the first timing offset value $N_{TA}$ from the formula $N_{TA}=T_A \cdot 16 \cdot 64/2^\mu$, wherein $2^\mu *15$ kHz is the subcarrier spacing and $T_A$ is the first index value.

16. The non-transitory computer-readable storage medium of claim 14, wherein the program instructions are further executable to configure the processor to:
determine the second timing offset value $N_{TA,\Delta}$ from the formula $N_{TA,\Delta}=T_{A,\Delta} \cdot 16 \cdot 64/2^\mu$, wherein $2^\mu \cdot 15$ khz is the subcarrier spacing and $T_{A,\Delta}$ is the first index value.

17. A method, comprising:
by an Integrated Access and Backhaul (IAB) node of an IAB network, wherein the IAB network comprises an IAB donor and a plurality of IAB nodes to operate as relays between the IAB donor and a plurality of User Equipment (UEs):
decoding first signaling that includes a first index value for a first timing offset value used by the IAB node in determining uplink timing for transmission to the IAB donor;
decoding, from the IAB donor, second signaling that includes a second index value for a second timing offset;
determining, based on the first timing offset and the second timing offset, a downlink transmit timing of the IAB node;
encoding a downlink communication for transmission to the UE in accordance with the determined transmit timing.

18. The method of claim 17, wherein a time difference between the start of a downlink frame at the UE and the start of an uplink frame transmission from the UE is based on the first timing offset.

19. The method of claim 17, further comprising:
determining a downlink transmit timing of the IAB node by multiplying a sum of three terms by Tc=0.509 nanoseconds, wherein:
a first term of the three terms is based on the first timing offset;
a second term of the three terms is based on the second timing offset; and
a third term of the three terms is based on a frequency range (FR).

20. The method of claim 17, wherein the second index value is received in a IAB timing advance delta medium access control (MAC) control element (CE).

* * * * *